United States Patent [19]

Davies et al.

[11] 4,118,755
[45] Oct. 3, 1978

[54] SELF-COOLED METAL-CLAD SWITCHGEAR

[75] Inventors: Norman Davies, Trafford, Pa.; Morley P. Langley, Boksburg, Transvaal, South Africa; Howard C. Peppel, deceased, late of Murrysville, Pa., by Virginia L. Peppel, administrator

[73] Assignee: Westinghouse Electric Corp., Pittsburgh, Pa.

[21] Appl. No.: 839,531

[22] Filed: Oct. 5, 1977

Related U.S. Application Data

[63] Continuation of Ser. No. 675,013, Apr. 8, 1976.

[51] Int. Cl.² ............................................. H02B 1/18
[52] U.S. Cl. ................................... 361/379; 200/289; 174/16 R; 336/59
[58] Field of Search ............. 336/59; 174/16 R, 16 B; 200/50 AA, 289; 361/383, 384, 379, 335, 336

[56] References Cited

U.S. PATENT DOCUMENTS

| | | | |
|---|---|---|---|
| 2,340,727 | 2/1944 | Zelt | 336/59 |
| 2,467,377 | 4/1949 | Geigerich | 336/59 |
| 2,824,939 | 2/1958 | Claybourn | 200/289 |
| 3,793,562 | 2/1974 | Cleaveland | 361/379 |

*Primary Examiner*—Gerald P. Tolin
*Attorney, Agent, or Firm*—M. S. Yatsko

[57] ABSTRACT

Metal-clad switchgear utilizing means to provide for self-cooling of the current transformers and primary disconnecting contacts. The support enclosure for the current transformers and the disconnecting contacts is apertured beneath the location of the current transformers, and air may enter the enclosure to cool the current transformers and contacts. A ventilating duct is in fluid communication with air within the enclosure, and transports the heated air from the enclosure to exhaust vents situated at the top of the metal-clad switchgear housing.

8 Claims, 2 Drawing Figures

SELF-COOLED METAL-CLAD SWITCHGEAR

This is a continuation of application Ser. No. 675,013, filed Apr. 8, 1976.

BACKGROUND OF THE INVENTION

This invention relates generally to metal-clad switchgear and, more particularly, to self-cooling of the primary disconnecting contacts and current transformers for removable circuit breaker units in metal-clad switchgear.

The primary disconnecting contacts for drawout circuit breaker units are usually disposed inside of bushings when the switchgear is utilized in relatively high voltage systems. Surrounding the bushings, and therefore, the primary contacts, are current transformers which are utilized to monitor the current flow through the contacts. The supports for the current transformers usually surround and enclose the current transformers and the bushings and contacts disposed therein. However, a problem arises when the amount of current flowing through the contacts becomes relatively large. The current flowing through the contacts causes the contacts to heat. At the same time, the current transformers also heat. This causes a temperature rise within the enclosure formed by the current transformers support, which temperature rise, for safety reasons, must be minimized.

One method utilized in the prior art to limit the temperature rise was the use of forced cooling by means of fans and blowers to cool the current transformers and primary disconnecting contacts. This use of blowers and fans has drawbacks, however, in that it was not always possible to provide adequate cooling of the current transformers, and also in that space and energy must be utilized to install and operate the fans and blowers.

SUMMARY OF THE INVENTION

The aforementioned problem in the prior art is eliminated by this invention by providing a switchgear structure utilizing self-cooling of the current transformer and disconnecting contacts. The switchgear structure includes a housing with a circuit breaker unit removably disposed therein, a plurality of primary disconnecting contacts for the circuit breaker unit, and individual bushing surrounding each disconnecting contact and a current transfomer surrounding each bushing. Surrounding and enclosing the current transformers and bushings, and thereby the contacts, are a support means utilized for supporting the current transformers. The support means have a plurality of openings therein vertically lower than the current transformers. The switchgear structure housing has entrance means disposed vertically lower than the support means, and the entrance means are utilized for inserting a cooling fluid into the housing. The entrance means are in fluid communication with the support means opening. Disposed vertically higher than the current transformers are exhaust means, which are utilized for exhausting fluids from within the housing, and a ventilating duct which extends from the support means enclosure to the exhaust means. The ventilating duct transports the cooling fluid from the current transformers to the exhaust means. The cooling fluid flow is therefore along the path defined as through the entrance means, through the support means openings to the inside of the enclosure made by the support means, adjacent to the current transformers and bushings, where it removes heat therefrom, into the ventilating duct and out of the housing through the exhaust means.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
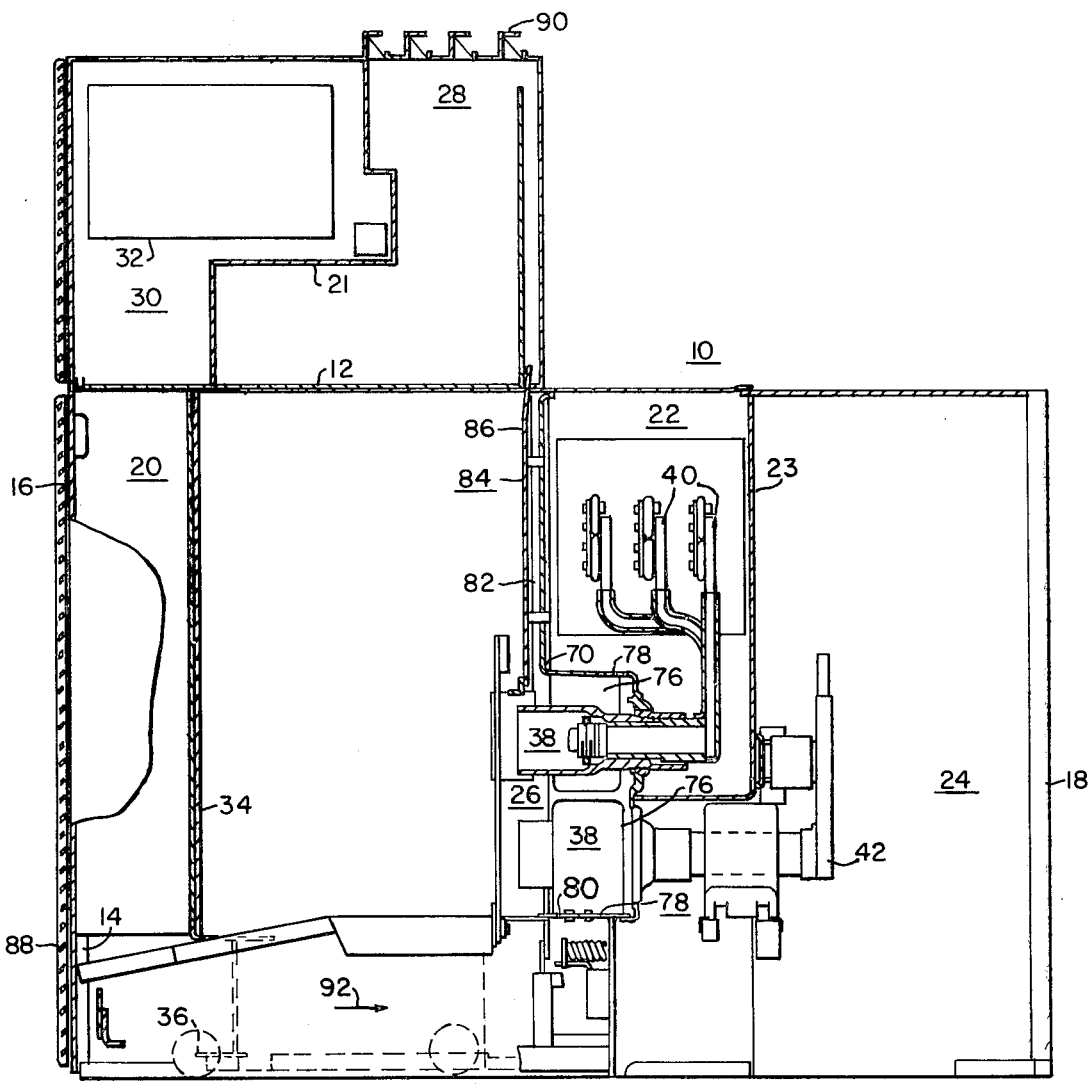
FIG. 1 is a view, partly in section and partly in elevation, of a metal-clad switchgear structure embodying the principal features of the invention.

Referring now to the drawing, and more particularly to FIG. 1, the structure shown comprises a metal-clad switchgear housing 10, which may be constructed by securing sheet metal members 12 to angle frame members 14 in a manner well-known in the art. A hinged door 16 is provided at the front of the housing 10, and a removable panel 18 is provided at the rear of the housing to permit access to the inside of the housing 10. The switchgear structure may rest upon beams (not shown) embedded in a suitable foundation.

The housing 10 may be divided into a plurality of compartments, such as a circuit breaker compartment 20, a bus compartment 22, an outgoing cable compartment 24, and a contact and current transformer compartment 26. Also included may be an exhaust compartment 28, and a control compartment 30 in which the various relays and instrumentation 32 is situated. The compartments are separated by partition members 21, 23, 70 and support means 78. The enclosure is completed by side sheets (not shown).

A circuit breaker unit 34 is disposed in the breaker compartment 20, and may be moved horizontally into and out of the housing on wheels 36. In accordance with the usual practice, the breaker unit 34 is provided with primary disconnecting contacts 38 which connect the breaker unit 34 to bus bars 40 and outgoing conductors 42.

Figure 2:
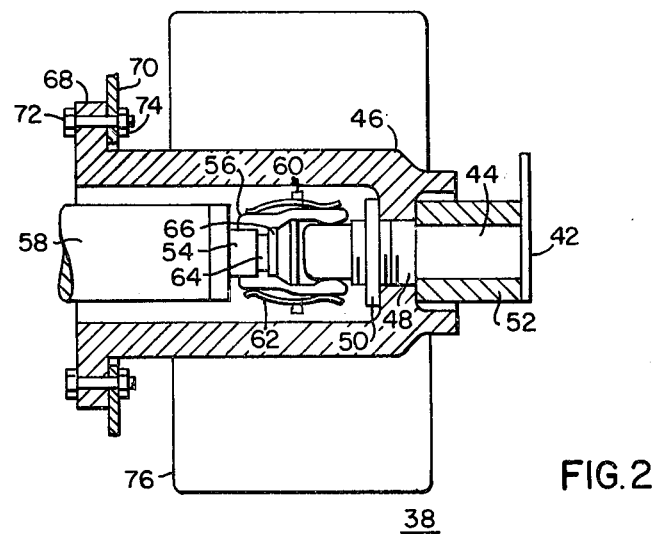
FIG. 2 is an enlarged view, in section, of one of the primary disconnecting contacts utilized in the switchgear structure.

As shown more clearly in FIG. 2, each primary disconnecting contact 38 comprises a stationary portion and a movable portion. The stationary portion comprises a round stud 44 which is mounted in a generally cylindrical insulating bushing 46. The stud 44 has an enlarged portion 48 which is disposed in an opening in the rear end of the bushing 46. A nut 50 threaded on the enlarged portion 48 may be drawn against the inside of the end of the bushing 46 and a spacing sleeve 52 is disposed on the stud 44 between the bushing 46 and the conductor 42 which is secured to the outer end of the stud 44. Thus, the spacing sleeve 52 may be drawn against the outside of the bushing 46 by tightening the nut 50 against the inside of the bushing 46 to retain the stud 44 in the bushing 46. The movable portion of the disconnecting contact 38 comprises a round stud 54 and a plurality of contact fingers 56 disposed around the periphery of the stud 54. The stud 54 is connected to a terminal of the circuit breaker 34 and is carried by the circuit breaker unit 34. An insulating sleeve 58 surrounds a portion of the stud 54.

In order to retain the contact fingers 56 in their angular position around the periphery of the stud 54, a spacing ring 60 is provided. The ring 60 has openings therein for the fingers 56, and a leaf-type spring 62 is disposed between each finger 56 and the ring 60 to maintain contact pressure between the fingers 56 and the stud 44 and 54. A groove 64 is provided near the end of the stud 54 for receiving an inwardly extending projection 66 on each contact finger 56 to maintain the finger 56 on the stud 54 when the movable portion of the contact assembly is disengaged from the stationary stud 44. The opened end of the bushing 46 has a flange 68 thereon, which may be attached to the partition member 70 of the housing 10 by bolts 72 which may be threaded into nuts 74 welded to the member 70.

Surrounding each bushing 46, and therefore also surrounding each disconnecting contact 38, is a current transformer 76. The purpose a current transformer 76 is to monitor the amount of current flowing through the primary disconnecting contact 38, which is also the amount of current flowing through the conductors 40 or 42.

As shown in FIG. 1, the current transformers 76 are enclosed within, surrounded by, and supported by a support means 78. The support means 78 surround the current transformers 76 which in turn surround the bushings 46 and the contacts 38. It is within the enclosure formed by the support means 78 that the temperature rise must be limited for safety consideration.

To provide cooling of the enclosure 26 within the support means 78, the support means 78 have apertures or openings 80 therein which are located at an elevation lower than the elevation of the current transformers 76. Near the top of the enclosure 26, the support means 78 also has an opening 82. Disposed within this opening 82 and extending into the enclosed area 26 is a ventilating duct 84. The ventilating duct 84 is formed of two segments; one side of the duct comprising the barrier 70; and the other duct comprising a separate elongated material 86 secured to the barrier 70. Also included within the means for self-cooling are louvered openings 88 within the door 16, and exhaust means 90 at the top of the housing 10, and more particularly, at the top of the exhaust compartment 28. The exhaust means 90 can, for example, be vents.

The current transformers 76, and the primary disconnecting contact 38 are cooled by the flow of air. Air enters through the louvered openings 88 in the door, flows underneath the circuit breaker unit 34 as indicated by the arrow 92, flows through the openings 80 in the support means 78, and flows adjacent to the current transformers 76 and the bushing 46. As it flows alongside the current transformers 76 and the bushings 46, the air receives heat from these two sources, becomes heated and rises towards the top of the enclosure 26. As the air rises, it flows into the ventilating duct 84, and flows through the ventilating duct 84 to the exhaust compartment 28 adjacent the exhaust means 90. As the hot air continues rising, it flows out of the housing 10 through the vents 90. Thus, it can be seen that the switchgear structure described in this embodiment provides self-cooling for the current transformers and primary disconnect switches without need of fans or blowers to provide cooling and ventilating force.

We claim as our invention:

1. A self-cooled switchgear structure comprising, in combination:
    a housing having a plurality of compartments therein including a contact and current transformer compartment and an exhaust compartment;
    a circuit breaker removably disposed in one of said compartments;
    a plurality of primary disconnecting contacts for said circuit breaker disposed in said contact and current transformer compartment;
    an individual bushing surrounding each disconnecting contact;
    a current transformer surrounding each disconnecting contact and the bushing associated therewith;
    apertured support means for supporting said current transformers, said support means surrounding said current transformers and forming said contact and current transformer compartment;
    entrance means disposed in said housing, vertically lower than said support means, for inserting a cooling fluid into said housing, said entrance means being in fluid communication with said current transformer through said apertured support means, said cooling fluid flowing adjacent said current transformers and said bushings to provide cooling thereof;
    exhaust means disposed in said housing, vertically higher than said current transformers and extending into said exhaust compartment, for exhausting fluid from within said exhaust compartment; and
    duct means disposed within said housing for transferring cooling fluid from said contact and current transformer compartment to said exhaust compartment, said duct means terminating, at one end thereof, within said exhaust compartment, and, at the other end thereof, in said contact and current transformer compartment and in fluid communication with the cooling fluid flowing adjacent to said current transformers and said bushings.

2. The switchgear structure according to claim 1 wherein said support means are apertured at locations vertically lower than said current transformers.

3. The switchgear structure according to claim 2 wherein said apertures are in the form of holes.

4. The structure according to claim 1 wherein said cooling fluid is air.

5. The switchgear structure according to claim 1 wherein said exhaust means comprises vents.

6. An improved self-cooled switchgear structure of the type including a housing, a circuit breaker unit removably disposed within said housing, a plurality of primary disconnecting contacts for said circuit breaker unit disposed within said housing, an individual bushings surrounding each disconnecting contact, current transformers surrounding each disconnecting contact and the bushing associated therewith, and support means for supporting each said current transformer enclosing said transformers and said bushings associated therewith, wherein the improvement comprises:
    an exhaust compartment disposed in said housing vertically higher than the enclosure formed by said support means;
    said support means having a plurality of openings therein vertically lower than said current transformers;
    entrance means disposed within said housing vertically lower than said support means for inserting a cooling fluid into said housing, said entrance means being in fluid communication with said support means openings;
    exhaust means disposed in said housing vertically higher than said current transformers and extending into said exhaust compartment for exhausting fluid from said exhaust compartment; and a ventilating duct extending from the enclosure formed by said support means to said exhaust compartment, said ventilating duct transporting said cooling fluid from said current transformers to said exhaust compartment.

7. The switchgear structure according to claim 6 wherein said cooling fluid is air.

8. The switchgear structure according to claim 6 wherein said exhaust means comprises vents.

* * * * *